United States Patent [19]
Alireza et al.

[11] Patent Number: 5,580,168
[45] Date of Patent: Dec. 3, 1996

[54] MIXING SYSTEM EMPLOYING A DISPERSION TANK WITH VENTURI INPUT FOR DISSOLVING WATER SOLUBLE ADDITIVES INTO IRRIGATION WATER

[75] Inventors: Ghassan A. Alireza; Tiomthy E. Alderson, both of Pasadena, Calif.

[73] Assignee: Agrigator, Pasadena, Calif.

[21] Appl. No.: 457,630

[22] Filed: Jun. 1, 1995

[51] Int. Cl.[6] ............................. B01F 5/04; B01F 5/10
[52] U.S. Cl. ........................... 366/153.1; 366/163.2; 366/172.2; 366/270; 366/327.3
[58] Field of Search ..................... 366/132, 134, 366/152.6, 153.1, 155.1, 163.2, 174.1, 175.2, 172.2, 262, 263, 265, 270, 293, 327.3, 327.4, 330.1

[56] References Cited

U.S. PATENT DOCUMENTS

| | | | |
|---|---|---|---|
| 2,795,403 | 6/1957 | Mead | 366/163.2 X |
| 3,123,362 | 3/1964 | Elvers, Sr. | 366/163.2 X |
| 3,374,989 | 3/1968 | Todtenhaupt | 366/327.3 |
| 3,491,949 | 1/1970 | Hairston | 137/563 X |
| 3,819,157 | 6/1974 | Markfelt | 366/163.2 X |
| 3,976,087 | 8/1976 | Bolton et al. | 366/163.2 X |
| 4,007,921 | 2/1977 | Zingg | 366/136 X |
| 4,100,614 | 7/1978 | Mandt | 366/163.2 X |
| 4,210,166 | 7/1980 | Munie | 366/163.2 X |
| 4,863,277 | 9/1989 | Neal et al. | 366/163.2 X |
| 5,211,475 | 5/1993 | McDermott | 366/163.2 X |
| 5,344,619 | 9/1994 | Larwick et al. | 366/163.2 X |

Primary Examiner—Charles E. Cooley
Attorney, Agent, or Firm—Christie, Parker & Hale, LLP

[57] ABSTRACT

A mixing system for dissolving water soluble additive into irrigation water employs a venturi system for introduction of water soluble additive into a water stream for injection into a dispersion tank employing low speed contradirectional impellers. Dispersion of the additive through the venturi and gentle yet vigorous agitation in the dispersion tank by contradirectional impellers mixes the additive without shearing of long chain polymers thereby assuring maximum efficacy for the additive solution.

8 Claims, 10 Drawing Sheets

MIXING SYSTEM EMPLOYING A DISPERSION TANK WITH VENTURI INPUT FOR DISSOLVING WATER SOLUBLE ADDITIVES INTO IRRIGATION WATER

FIELD OF THE INVENTION

The present invention relates to mixing of water soluble additives for irrigation water. In particular, the present invention provides a venturi system for introduction of powder additives comprising long linear chain, high molecular weight, water soluble polymers such as polyacrilamide into a water stream in combination with low speed contradirectional impellers for dispersion and mixing of the additive without shearing of long chain polymers present in the additive.

BACKGROUND OF THE INVENTION

Application of fertilizers, soil additives, and other soil conditioning products to agricultural fields has become a main stay requirement for worldwide agricultural operations. Differing materials require various application methods and many of the additives employed require mixing prior to application. Such mixed chemicals are often introduced into the produce fields by incorporation into irrigation water.

Advances in polymer chemistry have led to the evolution of sophisticated polymers which are now being used agriculturally. The maximum benefit from the polymers is derived by avoiding mechanical shearing and maintaining the long chain characteristic of the polymer. In the prior art, the addition of such additives into irrigation water has employed conventional mixing techniques, including, hand mixing, standard rotating barrel mixing, and conventional impeller mixing systems.

These prior art techniques often result in shearing of the long polymer chains in the additive thereby reducing the efficacy of the additive as it reaches the soil. The present invention provides an integrated, continuous flow, mixing system which achieves proper polymer concentrations in the water by precise metering of powder and flow regulation of water to prevent congelation, and to allow proper dispersion and hydration of the dry particles into the irrigation stream. In addition, vigorous yet gentle agitation is employed to dissolve the additives without adversely altering their physical properties. System sizing and flow sequencing assures sufficient time for additives to dissolve thoroughly into solution before being injected into the irrigation system.

The present invention is amenable to full automation and may be incorporated in self contained and portable systems.

SUMMARY OF THE INVENTION

The mixing system of the present invention employs a dry product hopper for introduction of the additive into the system. The additive is metered from the hopper through a flow regulating device and introduced through a cyclonic venturi system for combination with irrigation water. A dispersion tank receives the initial mix of water and additive and incorporates at least two contradirectional low speed impellers which vigorously, yet gently, agitate the solution and create counter flow mixing throughout the dispersion tank.

In various embodiments of the system, a rotating conical disperser located at the output of the venturis receives the initial water additive solution for even random dispersal across the solution surface in the dispersion tank. Additionally, using a progressive cavity pump to transfer solution from the dispersion tank to a solution aging tank of larger volume, which also employs counter flow impellers, allows longer term storage of the mixed solution while avoiding precipitation or congelation of the additive prior to use.

Multiple dispersion tanks are employed in certain embodiments to allow mixing of smaller quantities of additive solutions prior to entry into the solution aging tank. Multiple dispersion tanks allows preparation of an additive solution in one tank while pumping of solution from the alternate dispersion tank into the solution aging tank. The present invention provides continuous flow of irrigation water whole providing adequate resident time in the aging tank to achieve hydration of the polymer before being dispersed in irrigation water to the field.

BRIEF DESCRIPTION OF THE DRAWINGS

The details of the invention will be more clearly understood with reference to the following drawings:

FIG. 3b is a side sectional view demonstrating the various elements of the second dipersion tank and second additive hopper of FIG. 3a;

DETAILED DESCRIPTION OF THE INVENTION

Figure 1:
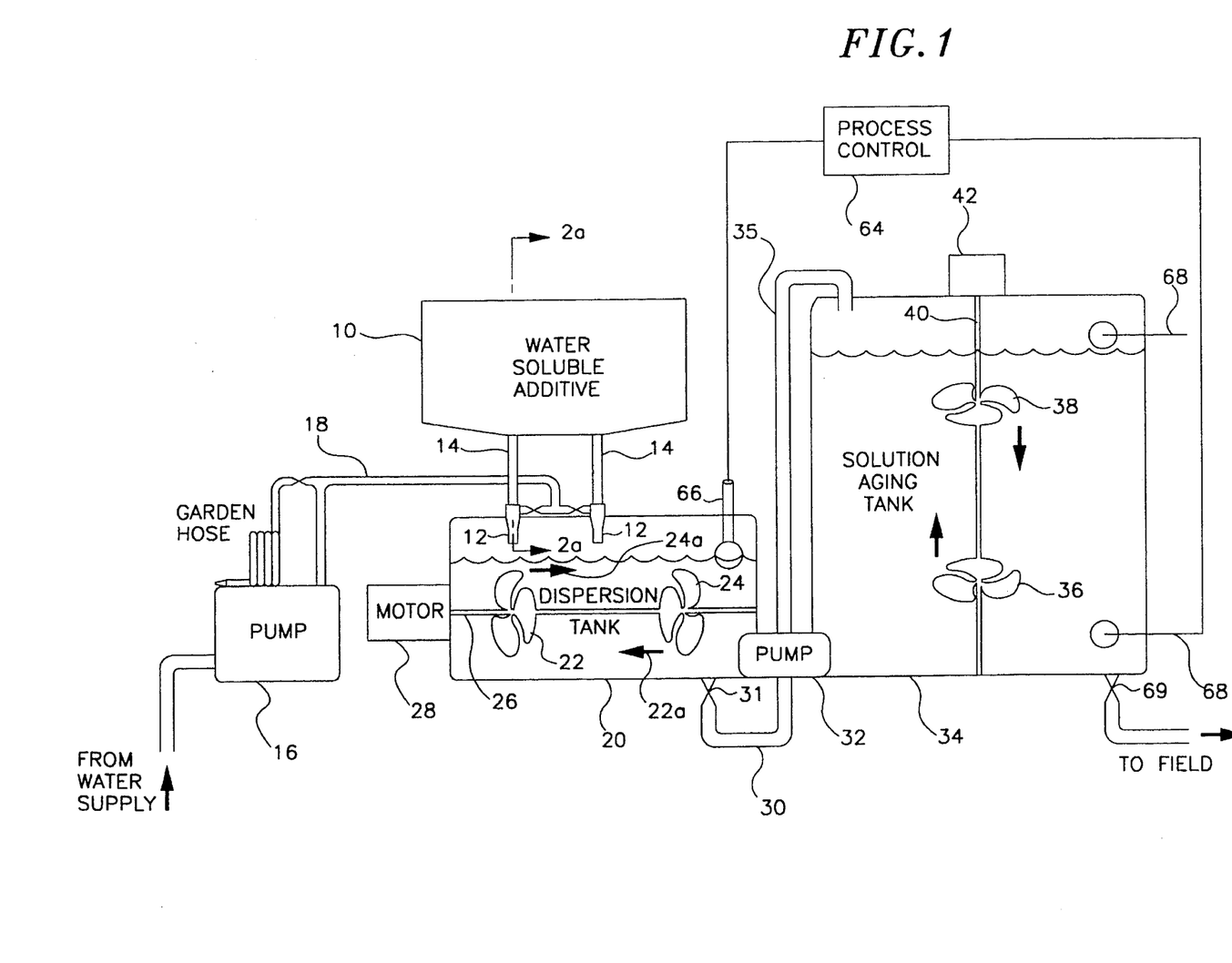
FIG. 1 is a side sectional view of a first embodiment of the system demonstrating the various elements of the system, including, the additive hopper, dispersion tank, and solution aging tank, with a horizontal flow dispersion tank displayed.

Referring to the drawings, FIG. 1 discloses a first embodiment of the invention which employs a dry additive hopper 10 in which the water soluble polymer additive is stored and introduced into the system. Twin cyclonic venturis 12 receive the dry additive from the hopper through double walled conduits 14 for mixing with water. The paired venturis are intended to be used one at a time with the second venturi providing backup for the system in case of clogging of the primary. However, both venturis may be used in parallel for high demand requirements. Double walled conduit intermediate the dry additive hopper and the venturis is employed to collect condensation which may be caused through temperature differential of the piping in the system due to cold water entering through the inlet manifold into the venturis. Collection of condensation by the outer wall of the conduit precludes water contact with the additive prior to mixing in the cyclonic venturi. Water from the available irrigation supply is provided through an inline separator/filter for removing dirt from the irrigation water by pump 16 to piping manifold 18 which introduces water into the cyclonic venturis.

The solution exiting the venturis is received in a dispersion tank 20. The dispersion tank in the embodiment shown in FIG. 1 incorporates contradirectional impellers 22 and 24 mounted on a common horizontal shaft 26. Rotation of the shaft by drive motor 28 causes solution within the dispersion tank to be urged in the direction of arrow 22a by impeller 22 and in the direction of arrow 24a by impeller 24. Use of large paddle, low velocity impellers allows agitation of the solution in the dispersion tank without shearing of long chain polymers present in the additive. Those skilled in the art will recognize that separately shafted counterrotating impellers driven by common or separate motors may be employed to provide contradirectional flow required by the present invention. Alternative embodiments of the invention employ a diagonal mounting of the impeller shaft or shafts to allow mounting of motors and associated hardware outside the tank without sealing requirements necessary for extending a horizontal shaft through the tank wall.

In normal operation, water flow through the venturis into the dispersion tank begins prior to introduction of water soluble additive from the hopper. This allows introduction of some water level into the dispersion tank for initiation of water agitation by the impellers prior to introduction of the additive. Similarly, water flow continues after introduction of the additive is complete to flush the venturis and associated lines. Adjustment of concentration of the water soluble additive during its introduction to accommodate a proper final concentration in the dispersion tank is accomplished through metering of the additive from the hopper through a flow regulating device, as will be explained in greater detail subsequently.

Once the dispersion tank is full of the proper concentration of additive and water, the mixture is allowed to remain under agitation by the low speed contradirectional impellers to assure complete mixing. The additive mixture is then extracted from the dispersion tank through conduit 30 employing a progressive cavity pump 32 to distribute the additive solution to a field for application, or as shown in the embodiment of FIG. 1 to introduce the mixture into a solution aging tank 34 through manifold 35. The aging tank employs twin contradirectional impellers 36 and 38 mounted on a common vertical shaft 40 driven by motor 42. As previously described with regard to the impellers in the dispersion tank, the contradirectional impellers force the mixture to flow in opposite directions within the solution aging tank to maintain the mixture in solution thereby precluding precipitation of the additive. The additive solution is then pumped from the solution aging tank to an irrigation distribution system in the field for application. The invention as described is configured as a parallel branch in the irrigation water flow path which draws water into the dispersion tank while simultaneously reintroducing mixed solution from the aging tank in proper concentration into the irrigation stream. Solution flows simultaneously into and out of the aging tank for a continuous flow process.

Figure 2A:
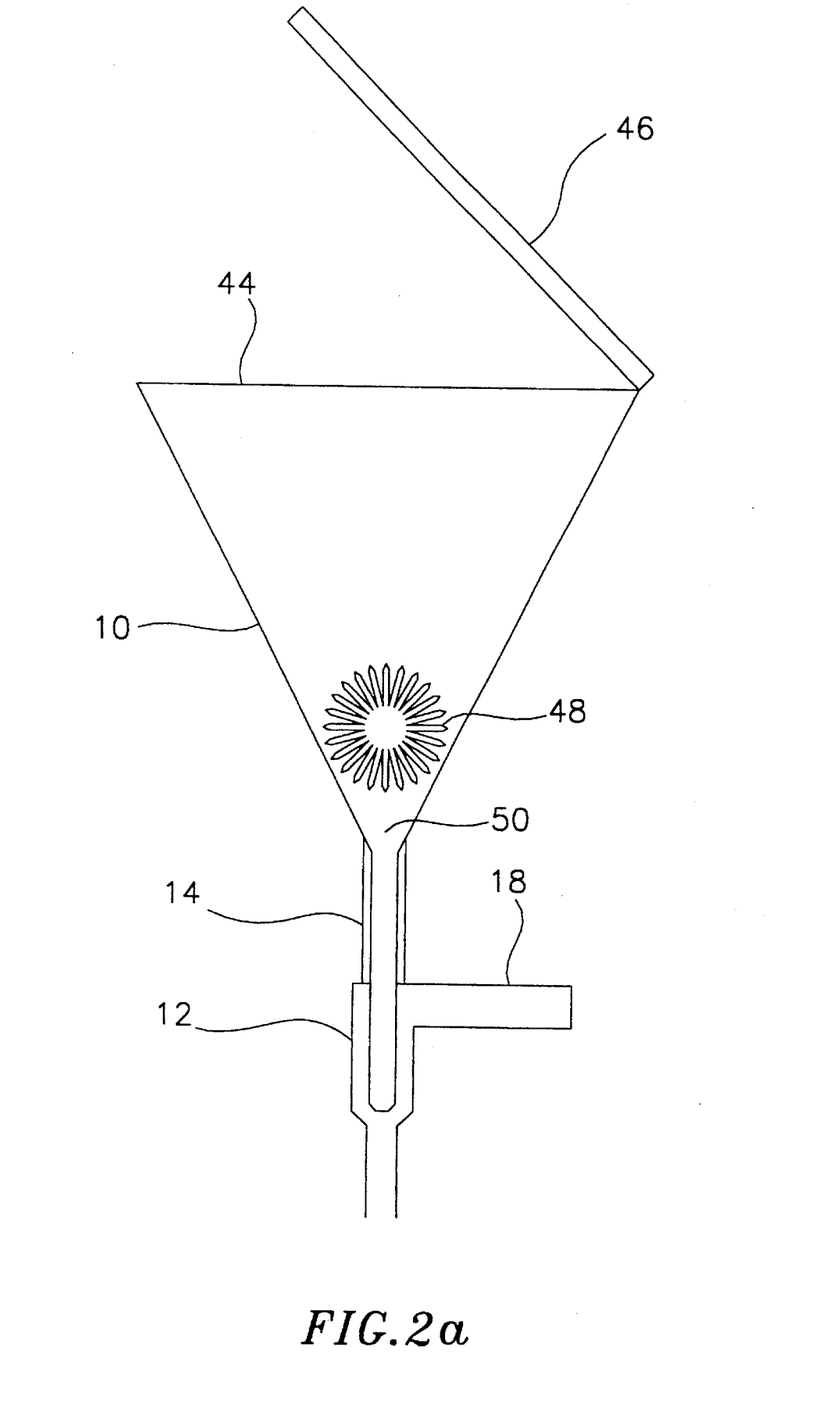
FIG. 2a is a sectional end view of the additive hopper and venturi system.
Figure 2B:
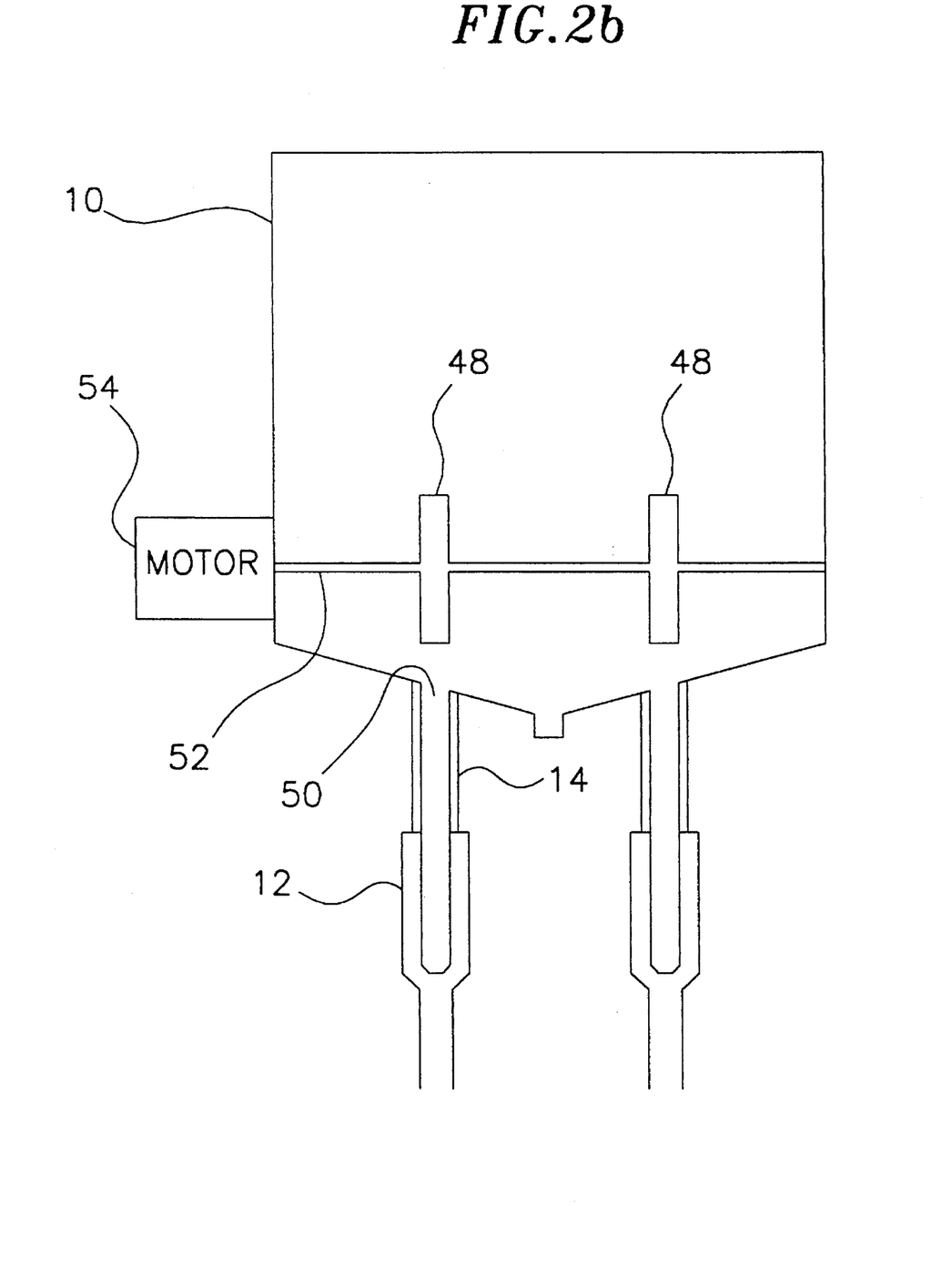
FIG. 2b is a sectional side view of the additive hopper.
Figure 2C:
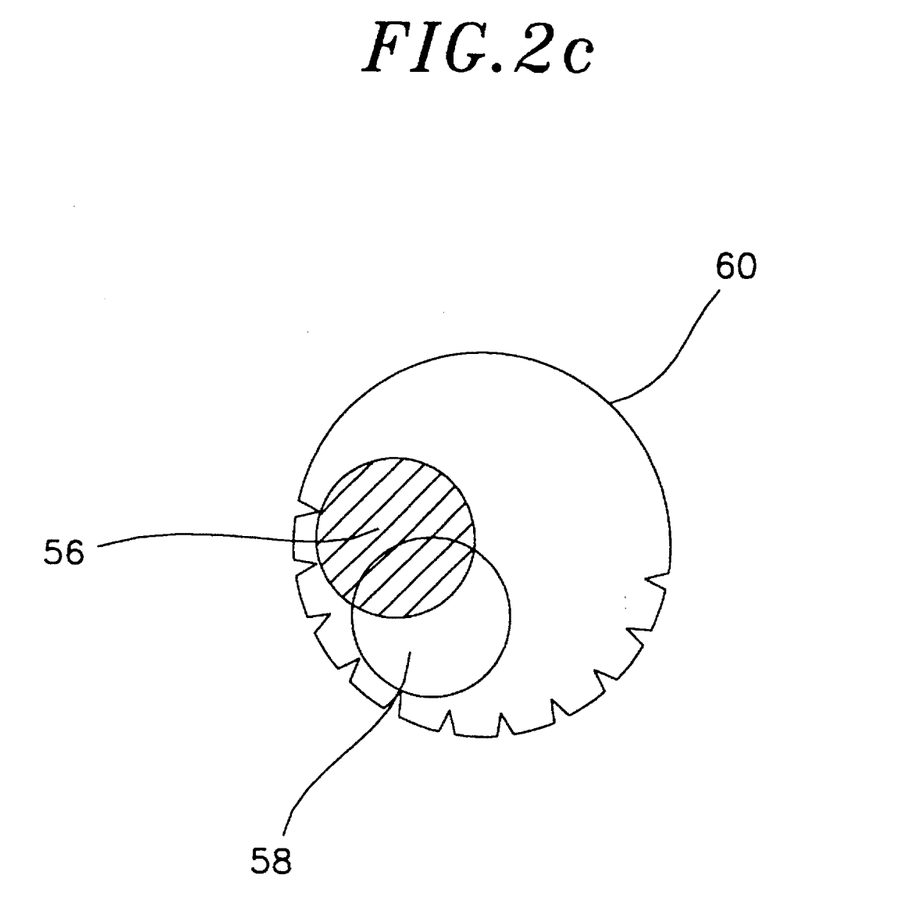
FIG. 2c is an exemplary embodiment of an additive flow regulating device for the exit of the hopper.

Details of the dry additive hopper of the present system are disclosed in FIGS. 2a through 2c. As shown in FIG. 2a, the dry additive is introduced into the top opening 44 of the hopper which employs a lid 46 to preclude contamination of the dry additive. Internal to the hopper, a sifting device is employed to deagglomerate the additive. As shown in FIGS. 2a and 2b, a pair of paddle wheels 48 located over the exit ports 50 in the hopper provide appropriate sifting. In the embodiment shown, the paddle wheels are driven on a common shaft 52 by an electric motor 54, however, independent shafts and motors are employed in alternative embodiments.

Metering of the additive from the hopper is accomplished employing a conventional flow regulating device as shown in FIG. 2c which comprises a horizontal sliding gate 56 variably occluding orifice 58 in plate 60 mounted in the hopper exit. Those skilled in the art will recognize alternate flow regulating devices known in the art of dry powder metering for substitution in the present invention.

Figure 3A:
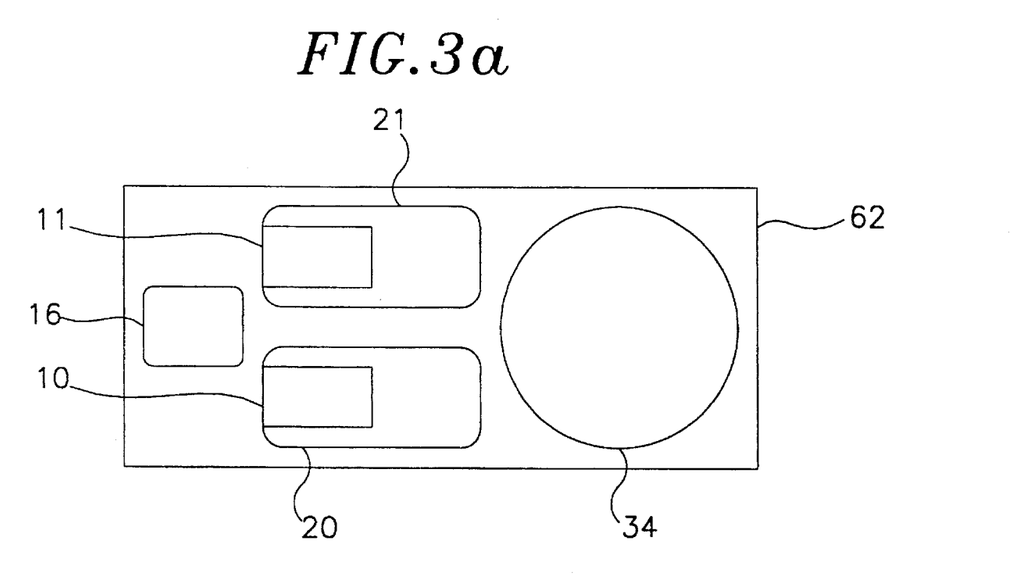
FIG. 3a is a top view of an embodiment of the invention as disclosed in FIG. 1 employing two dispersion tanks and two additive hoppers.
Figure 3B:
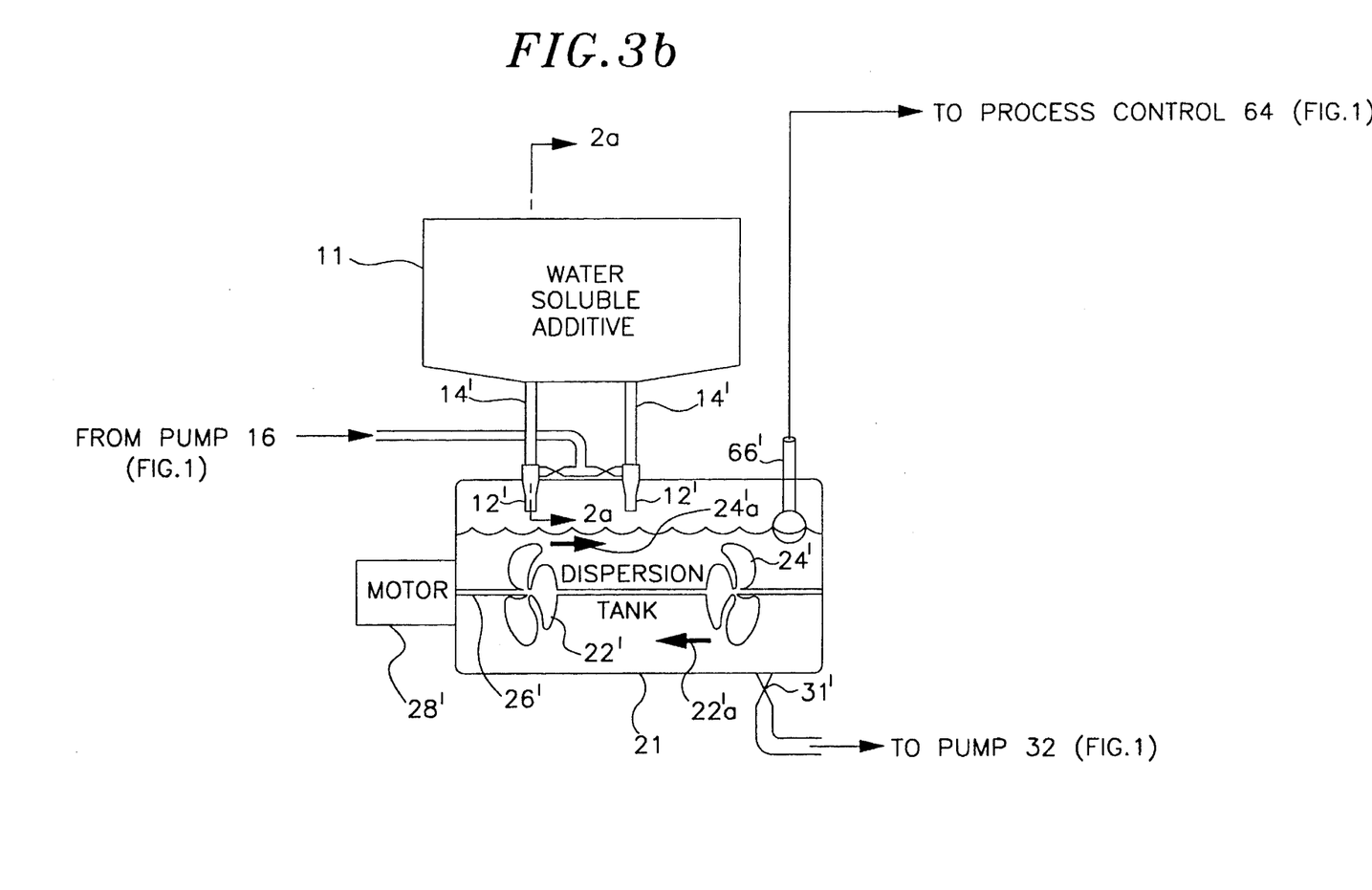

FIG. 3a shows an embodiment of the present invention employing dual dispersion tanks 20 and 21 with dual dry additive hoppers 10 and 11. FIG. 3b shows a side sectional view of the second dipersion tank and second dry additive hopper with associated components and manifolds wherein the components previously described with regard to FIG. 1 are identified by "'" e.g. venturies 12'. Operation of each of the dispersion tanks and hoppers is as described previously with regard to FIG. 1. Duplication of the entire process in a second dispersion tank allows one dispersion tank to be filled and mixed while the other dispersion tank, having completed the mixing process, is being emptied by pump 32 into the solution aging tank. Operation in this manner allows the aging tank to maintain a substantially constant level during initial mixing operations in the dispersion tanks and enhances the capability of the system to provide continuous flow to the irrigation system. Mounting of the dual dispersion tanks, aging tank, and all supporting pumps and power source on a skid pallet or trailer 62 provides a self contained portable system.

A process controller 64, as seen in FIG. 1, is incorporated to monitor level sensors 66 in the dispersion tanks and high and low level sensors 68 in the aging tank to automate operation of the mixing process. Control by the process controller of pumps 16 and 32, manifold valves 31 and 31', as well as flow regulating device 60 in the hopper outlets, responsive to fluid levels in the tanks allows complete automation of the system. Those skilled in the art will recognize the use of appropriate sensors in the dispersion tanks, including, float or capacitive type sensors.

In operation, the process controller initiates operation by activating pump 16 to provide water to the venturis for mixing of the water soluble additive. A control signal, activated by a low level indication in the dispersion tanks provides an exemplary initial start signal. In the dual dispersion tank system, upon a full indication from the level sensor in the first dispersion tank, the controller activates pump 32 for transfer of solution from the dispersion tank into the aging tank 34 with manifold valve 31 drawing solution from the first dispersion tank. Those skilled in the art will recognize that addition of a timer to allow adequate dispersion of the additive in the dispersion tank prior to initiating pump 32 may be employed. The controller selectively operates manifold valving to allow filling of the second dispersion tank while solution is being drawn from the first dispersion tank and similarly drawing solution from the second dispersion tank while refilling the first dispersion tank. This operation allows a substantially constant flow of solution to the aging tank which has sufficient volume to provide a constant solution stream at the desired concentration into the irrigation water. The controller operates manifold valve 69 to provide initial filling of the solution aging tank and again, a timer may be employed to assure sufficient hydration of the solution in the aging tank prior to reintroduction into the irrigation water. Once in operation, the system disclosed in the drawings provides a continuous flow of operation, drawing water from the irrigation supply and returning a proper solution concentration to the irrigation system for distribution to the field.

Figure 4:
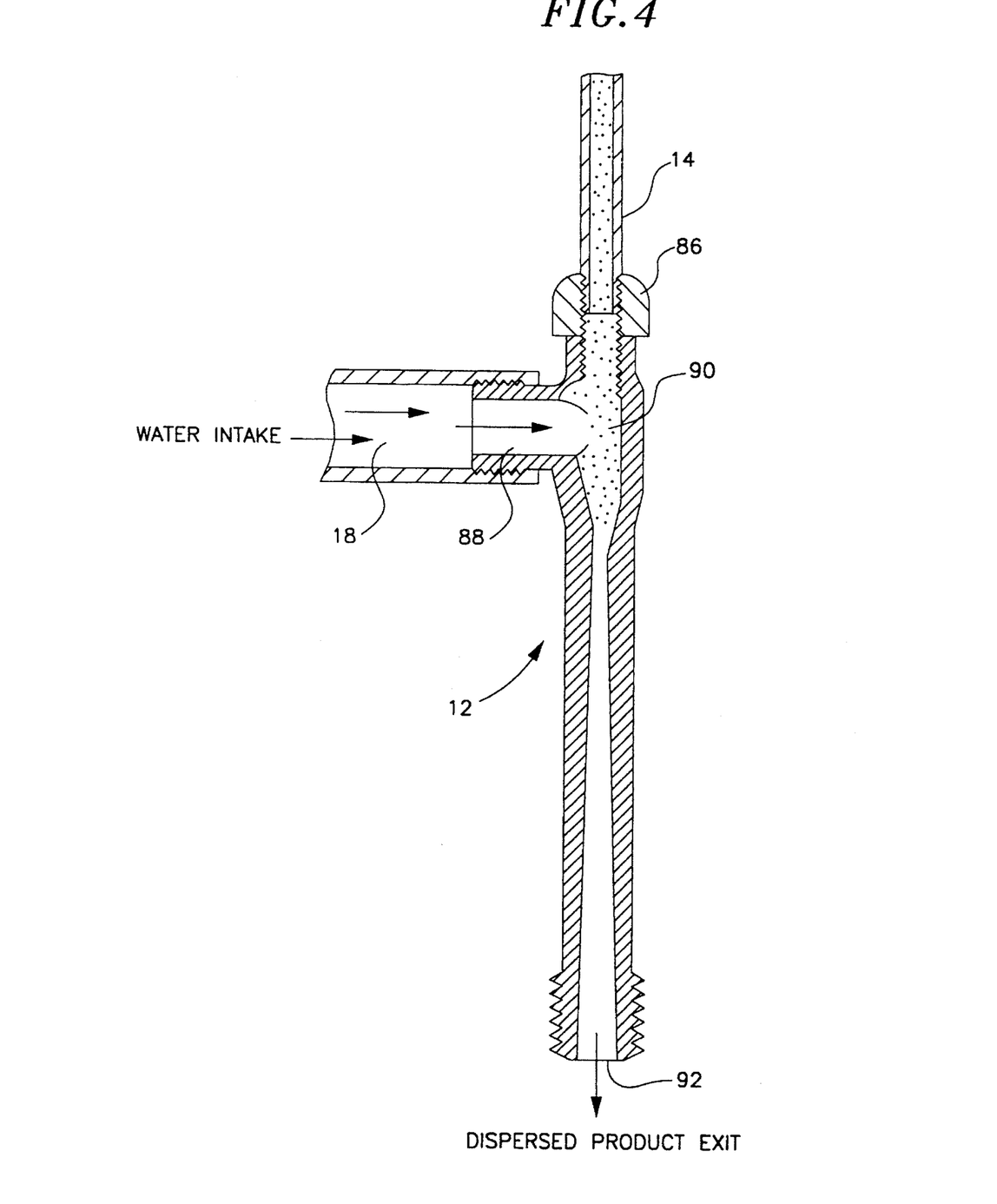
FIG. 4 is a detailed sectional view of an exemplary embodiment of the venturi for use in the present invention.

The cyclonic flow venturi employed in the embodiments of the invention shown in the drawings is shown in FIG. 4. The venturi shown is a modified Penberthy venturi which is commercially available.

As shown in FIG. 4 the venturi employed in the embodiment shown in the drawings employs sealed air vents at the entry connection 86 which provides a vacuum in conduit 14 drawing dry additive into the venturi due to water flow from conduit 18 into the water intake 88. The dry additive product mixes with the water in the cyclonic body of the venturi 90 and the solution of water and dispersed dry additive exits the venturi at orifice 92.

Figure 5A:
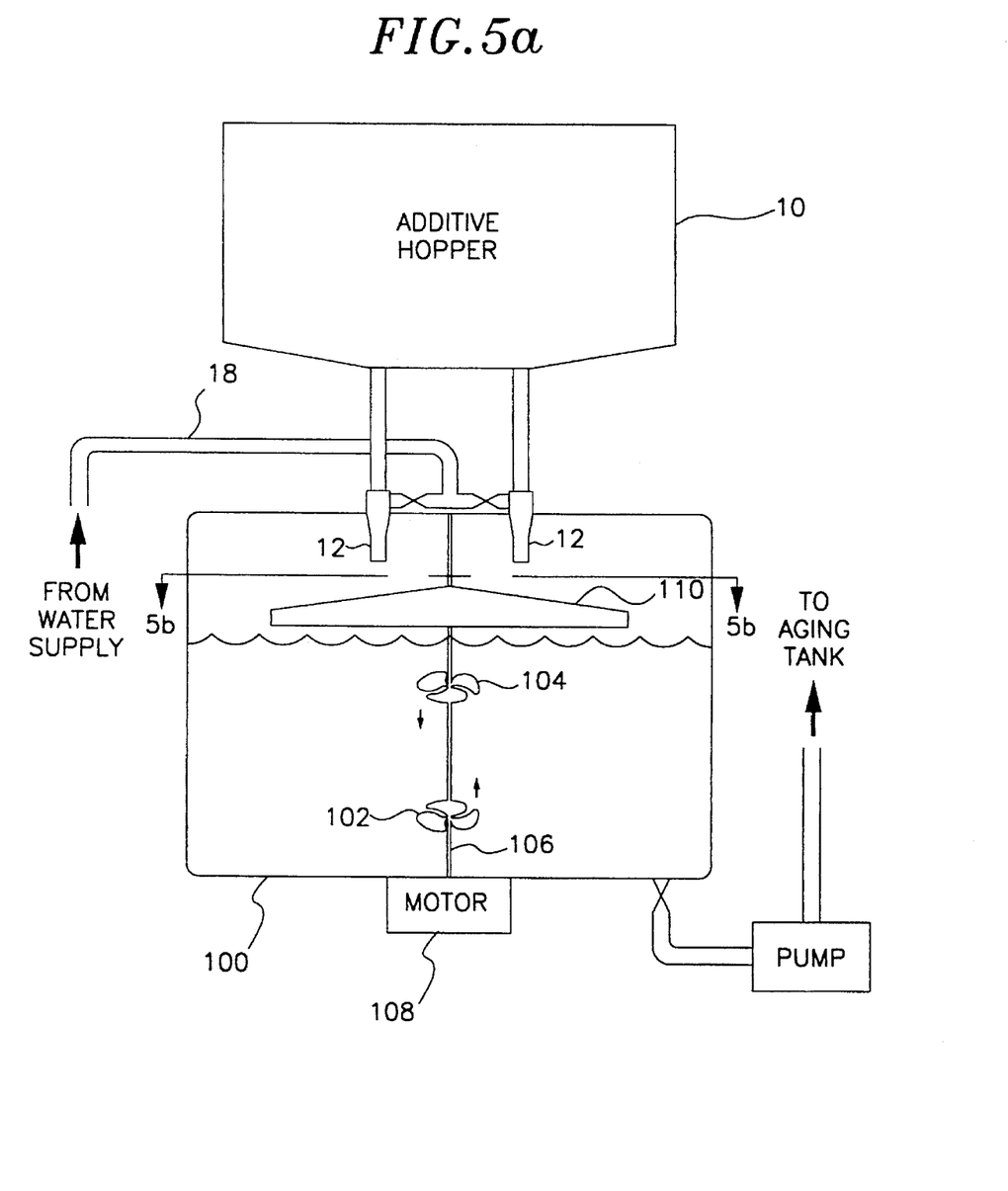
FIG. 5a is a side sectional view of a second embodiment of the dispersion tank employing vertical flow orientation of the contradirectional impellers and incorporating the conical disperser.
Figure 5B:
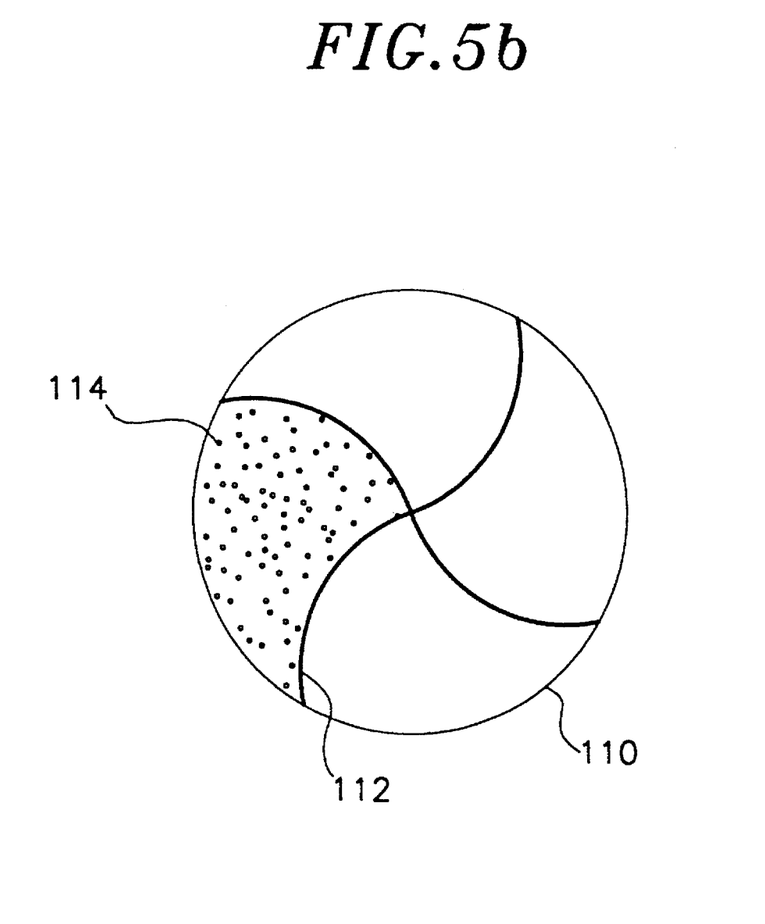
FIG. 5b is a top view of an embodiment for the conical disperser.

FIG. 5a discloses an alternate embodiment of the dispersion tank 100. Contradirectional impellers 102 and 104 are mounted vertically on a common shaft 106 driven by motor 108. Operation of the impellers in this orientation is as described previously with regard to the solution aging tank. A conical disburser 110 is also mounted to shaft 106 intermediate the venturi outlets and the high level water surface. The initial additive solution exiting the venturis impacts the rotating conical disperser and is evenly spread across the water surface in the dispersion tank by the conical disperser. As best seen in FIG. 5, the conical disperser employs paddle-like spokes 112 which, in the embodiment shown, extend in spaced curves from the apex of the conical disperser to its rim. A further refinement of the conical disperser incorporates apertures 114 spaced on the conical surface to intermediately disperse the additive solution onto the water surface prior to reaching the periphery of the conical disperser. Operation of the embodiment of the dispersion tank shown in FIG. 5a is substantially similar to the description provided with regard to FIG. 1.

Figure 6:
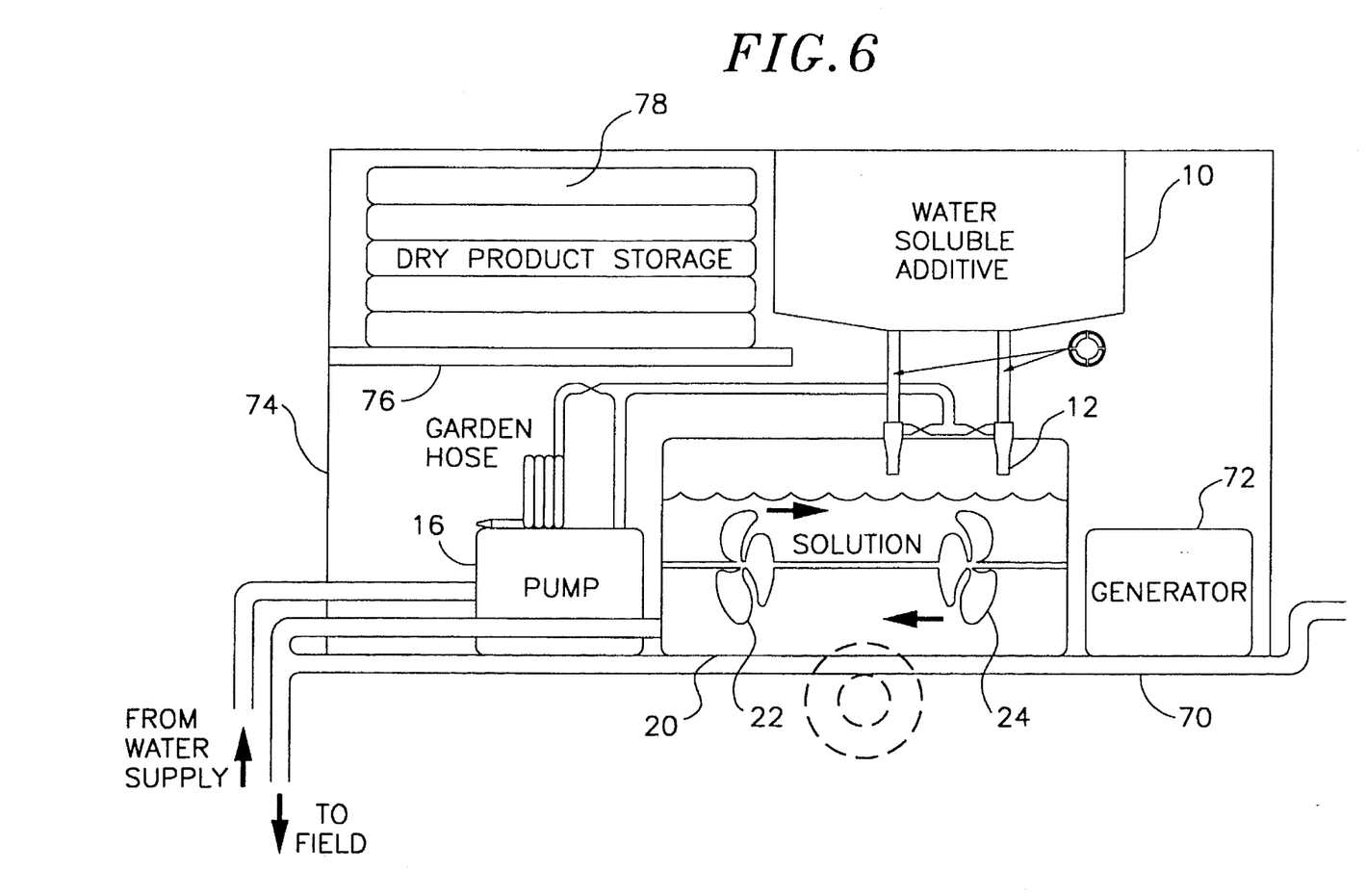
FIG. 6 is a side sectional view of a trailer mounted, small scale system employing the invention.

FIG. 6 discloses a trailer mounted limited scale version of the present invention for easy portability. The embodiment shown in FIG. 6 employs a single hopper 10 for dry additive, integrally mounted over a single dispersion tank 20 which incorporates horizontally mounted impellers. Operation of the system is substantially as described with regard to FIG. 1. The mounting trailer 70 incorporates a self-contained generator 72 for operation of the water pump 16, impeller motor, and any process controller employed. Trailer enclosure 74 incorporates shelving 76 for storage of the dry additive in bag form 78. The totally self-contained system as shown in FIG. 6, is employable in small-scale operations wherein quantity of additive supplied to the field or frequency of application preclude the need for large scale systems such as that disclosed in FIGS. 1 and 3. The lack of an aging tank in the embodiment shown in FIG. 6 does not allow for full hydration of the polymer additives, however, adequate dispersion of the additive in the water is achieved. The system disclosed in FIG. 6 is particularly applicable to open irrigation systems such as canals and furrows.

Having now described the invention in detail as required by the patent statutes, those skilled in the art will recognize substitutions and modifications to the embodiments of the invention herein. Such substitution and modifications are within the scope and intent of the invention as defined in the following claims.

What is claimed is:

1. A water soluble additive mixing system for water soluble polymer additives comprising:

a hopper for storage and metering of a dry additive;

a venturi mixing device having at least one venturi connected to receive additive from the hopper and connected to a water source;

a dispersion tank receiving an additive water solution from the venturi mixing device, said dispersion tank including at least two low speed contradirectional impellers for agitation of the solution in the tank; and means for extracting the solution from the dispersion tank for distribution in irrigating water to an agricultural field including a solution aging tank having at least two contradirectional low velocity impellers for agitation of the additive solution;

a first pump and first manifold for extracting solution from the dispersion tank and introducing solution into the aging tank; and an outlet conduit for distributing the additive solution as irrigation of water to the agricultural field.

2. A mixing system as defined in claim 1 further comprising:

a second additive hopper for storage in metering of the dry additive; and a second venturi mixing device having at least one venturi connected to receive additive from the second hopper and connected to the water source;

a second dispersion tank receiving the additive water solution from the second venturi mixing device, said second dispersion tank including at least two low speed contradirectional impellers for agitation of the solution in the tank and wherein the first manifold includes valving means for selectably extracting solution from the first or the second dispersion tank.

3. A mixing system as defined in claim 2 wherein said valving means are responsive to a first selection control signal for extraction of solution from the first dispersion tank and a second selection control signal for extraction of solution from said second dispersion tank and the system further comprising:

means for sensing solution level in the first dispersion tank;

means for sensing solution level in the second dispersion tank; and a process controller connected to said first and second dispersion tank sensing means and said controller providing said first selection control signal when said first dispersion tank sensing means indicates a full level and said second selection control signal when said second dispersion tank sensing means indicates a full level.

4. A mixing system as defined in claim 1 wherein the contradirectional impellers in the dispersion tank are mounted on a vertical drive shaft proximate the outlet of the venturi mixing device and further including:

a conical disperser mounted concentrically to the drive shaft intermediate the venturi mixing device and a solution surface within the dispersion tank, to receive additive solution from the venturi mixing device for dispersal over the solution surface.

5. A mixing system as defined in claim 4 wherein the conical disperser includes radially extending paddle spokes to engage and further disperse the additive solution received from the venturi mixing device.

6. A mixing system as defined in claim 5 wherein the conical disperser further includes apertures in the conical disperser intermediate the spokes for transmission of a portion of the additive solution through the conical disperser.

7. A mixing system as defined in claim 1 wherein the water source comprises a second pump connected to receive irrigation water, said first pump and said second pump operable by first and second control signals and the system further comprising:

means for sensing solution level in the dispersion tank;

means for sensing solution level in the aging tank; and a process controller connected to said dispersion tank sensing means and said aging tank sensing means, said controller providing said first control signal when said dispersion tank sensing means indicates a full level and providing said second control signal when said dispersion tank sensing means indicates a low level.

8. A water soluble additive mixing system for water soluble polymer additives comprising:

a first hopper for storage and metering of a dry additive;

a first venturi mixing device having at least one venturi connected to receive additive from the hopper and connected to a water source;

a first dispersion tank receiving an additive water solution from the first venturi mixing device, said dispersion tank including at least two low speed contradirectional impellers for agitation of the solution in the tank;

a second additive hopper for storage and metering of the dry additive; and a second venturi mixing device having at least one venturi connected to receive additive from the second hopper and connected to the water source;

a second dispersion tank receiving the additive water solution from the second venturi mixing device, said second dispersion tank including at least two low speed contradirectional impellers for agitation of the solution in the tank and means for extracting the solution from the first and second dispersion tanks for distribution in irrigating water to an agricultural field including a solution aging tank having at least two contradirectional low velocity impellers for agitation of the additive solution;

a first pump and first manifold with valving means for selectably extracting solution from the first or the second dispersion tank and introducing solution into the aging tank;

said valving means responsive to a first selection control signal for extraction of solution from the first dispersion tank and a second selection control signal for extraction of solution from said second dispersion tank;

means for sensing solution level in the first dispersion tank;

means for sensing solution level in the second dispersion tank; and a process controller connected to said first and second dispersion tank sensing means and said controller providing said first selection control signal when said first dispersion tank sensing means indicates a full level and said second selection control signal when said second dispersion tank sensing means indicates a full level; and an outlet conduit for distributing the additive solution as irrigation of water to the agricultural field.

* * * * *

UNITED STATES PATENT AND TRADEMARK OFFICE
CERTIFICATE OF CORRECTION

PATENT NO. : 5,580,168
DATED : December 3, 1996
INVENTOR(S) : Ghassan A. Alireza; Timothy E. Alderson It is certified that error appears in the above-indentified patent and that said Letters Patent is hereby corrected as shown below:

On title page,

Item [75] Inventors: "Tiomthy E. Alderson" should read
-- Timothy E. Alderson--

Signed and Sealed this

Fourth Day of November, 1997

Attest:

BRUCE LEHMAN

Attesting Officer

Commissioner of Patents and Trademarks